Figure 3:
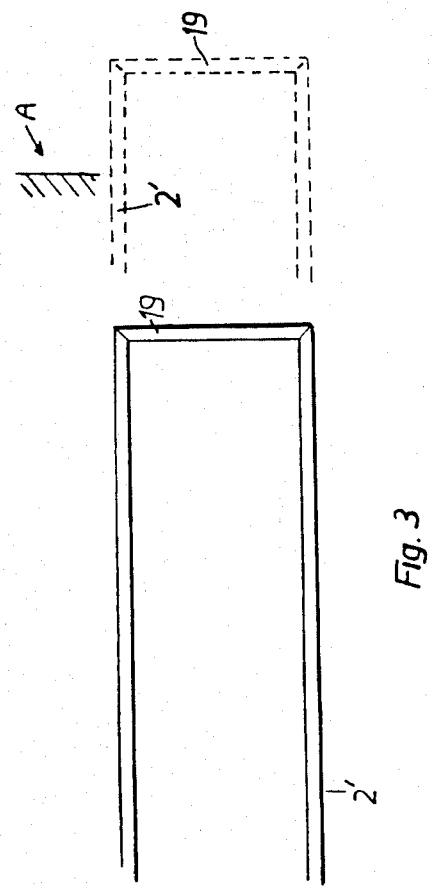

United States Patent [19]
Schabmüller

[11] Patent Number: 4,855,539
[45] Date of Patent: Aug. 8, 1989

[54] STOWING DEVICE FOR A CABLE FEED, PARTICULARLY FOR THE CONNECTING CABLE OF A CENTRAL AIRCRAFT POWER SUPPLY SYSTEM AT AIRPORTS

[76] Inventor: Heinz Schabmüller, Midgardstrasse 20, 8132 Tutzing, Fed. Rep. of Germany

[21] Appl. No.: 125,750

[22] PCT Filed: Jan. 27, 1986

[86] PCT No.: PCT/EP86/00034
§ 371 Date: Sep. 8, 1986
§ 102(e) Date: Sep. 8, 1996

[87] PCT Pub. No.: WO86/04463
PCT Pub. Date: Jul. 31, 1986

Related U.S. Application Data

[63] Continuation of Ser. No. 925,799, Sep. 8, 1986, abandoned.

[30] Foreign Application Priority Data

Jan. 26, 1985 [DE] Fed. Rep. of Germany ....... 3502640

[51] Int. Cl.$^4$ .............................................. H02G 11/02
[52] U.S. Cl. ................................................ 191/12.2 A
[58] Field of Search ...................... 191/12.2 A, 12.2 R, 191/12.4; 242/54 R; 339/119 C, 147 C; 439/501, 528

[56] References Cited

U.S. PATENT DOCUMENTS

| | | | |
|---|---|---|---|
| 944,786 | 12/1909 | Hinds | 191/12.2 R |
| 1,868,409 | 7/1932 | Crispen | 242/107.1 |
| 2,518,072 | 8/1950 | Rushworth | 191/12.2 R |

FOREIGN PATENT DOCUMENTS

| | | | |
|---|---|---|---|
| 0118025 | 9/1984 | European Pat. Off. | |
| 520564 | 3/1931 | Fed. Rep. of Germany | |
| 690601 | 4/1940 | Fed. Rep. of Germany | |
| 53624 | 9/1890 | Fed. Rep. of Germany | |
| 1036489 | 8/1958 | Fed. Rep. of Germany | |
| 2110838 | 9/1972 | Fed. Rep. of Germany | |
| 7811922 | 8/1978 | Fed. Rep. of Germany | |
| 2720159 | 10/1978 | Fed. Rep. of Germany | |
| 3128545 A1 | 2/1983 | Fed. Rep. of Germany | |
| 3506792 | 8/1985 | Fed. Rep. of Germany | 242/54 R |
| 336104 | 3/1959 | Switzerland | |
| 0708452 | 1/1980 | U.S.S.R. | 191/12.2 R |
| 0855819 | 8/1981 | U.S.S.R. | 191/12.2 R |
| 755991 | 8/1956 | United Kingdom | |

Primary Examiner—Johnny D. Cherry
Assistant Examiner—Joseph D. Pape
Attorney, Agent, or Firm—Ostrolenk, Faber, Gerb & Soffen

[57] ABSTRACT

A stowing device for a cable feed, particularly for the connecting cable of a central aircraft supply system at airports. The device has a cable fixed point at a passenger gate. The device comprises a double cable drum having a service drum for a service cable and a coaxial equalization drum for an equalization cable, and a drive for both directions of rotation of the drum. A saving in the total length of the connecting cable is obtained as translation movement is superimposed upon the rotation of the double cable drum. The double cable drum is displaced in a longitudinal guide over a distance equal to the length of the equalization cable which has been freed or wound up while the service cable is unwound or wound up, respectively. Alternately, the cable drum is supported on and translated with the moveable section of a guide rail.

5 Claims, 2 Drawing Sheets

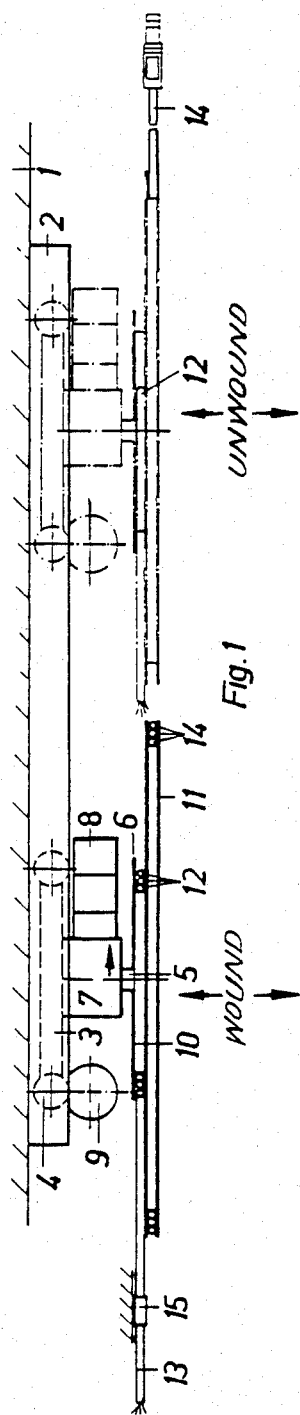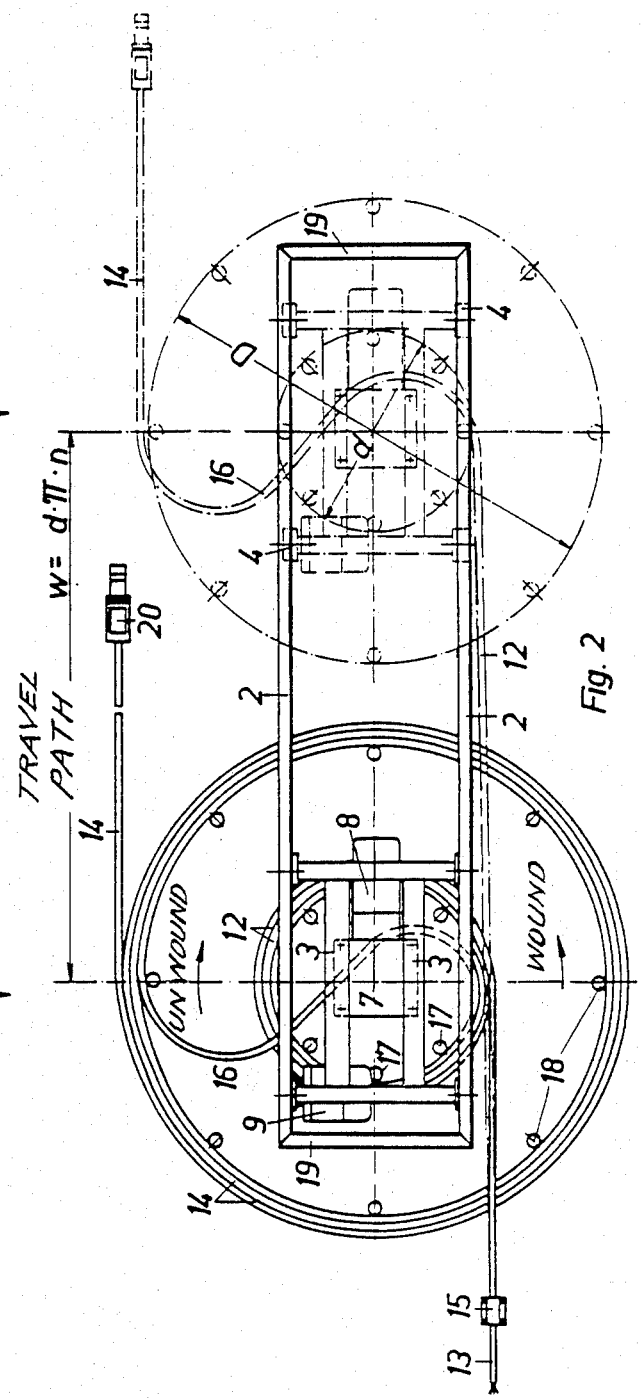

STOWING DEVICE FOR A CABLE FEED, PARTICULARLY FOR THE CONNECTING CABLE OF A CENTRAL AIRCRAFT POWER SUPPLY SYSTEM AT AIRPORTS

This is a Continuation of Application Ser. No. 925,799, filed on Sept. 8, 1986, now abandoned.

The present invention relates to a stowing device for a cable feed, particularly for the connecting cable of a central aircraft power supply system at airports. The device has a cable fixed point at or close to a passenger gate and has a double cable drum which receives, without twisting, corresponding lengths of cable as service cable and equalization cable. The drum comprises a service drum for the service cable and an equalization drum coaxial therewith for the equalization cable, as well as a drive for both directions of rotation of the drum.

In one known stowing device of this type (German Pat. No. 33 04 276) there is a double cable drum the equalization cable of which is arranged between a fixed cable connection and the radially inner end of the service cable and is radially displaceable in the form of an opening and closing spiral upon the winding and unwinding respectively of the service drum. This means that the length of cable which forms the equalization cable represents an unusable length of cable and to this extent therefore the cost of the stowing device is considerably increased. Such connecting cables are expensive parts. In one embodiment, which is common at the present time, its outside diameter is 46 mm; the cable cross section consists of four cable wires for the 400 cycle three-phase current supply and, in addition to this, of 20 to 30 control lines. The unusable length of the equalization cable in one practical embodiment of the known stowing device amounts to about two-thirds of the length of the service cable, i.e. about 12 meters for a prescribed length of the service cable of 18 meters.

Thus the object of the present invention is to create a stowage device of the aforementioned type which uses, as a whole, a shorter connecting cable than the known device does.

In order to achieve this purpose, it is proposed, in accordance with the invention, that a movement of translation be superimposed upon the rotation of the double cable drum, the double cable drum being displaced in a longitudinal guide over a distance which is equal to the length of equalization cable which is freed or wound up while the line cable is being unwound or wound up respectively.

With this solution, the path of travel of the double cable drum has a length which corresponds appoximately to the length of the equalization cable, and this is added to the length of the service cable. The maximum usable length of the stowage device thus corresponds to the sum of the unwound lengths of equalization cable and service cable with the equalization cable being completely unwound. Expressed mathematically, with n turns, an average diameter of the service drum D and an average diameter of the equalization drum d, the usable length L corresponds approximately to the formula:

$$L = (D+d) \cdot \pi \cdot n;$$

As compared with the known stowing device described at the beginning hereof, there is obtained a saving in total cable length equal to the unwound length of equalization cable. If the place of attachment of the double cable drum is on the floor of the gate, for instance at the outermost end of the head of the bridge of a passenger gate, guidance of the double cable drum can be developed so that it can be extended beyond the head of the gate. In this way, there is even obtained a saving of length of service cable, since the extension path can be subtracted from the maximum length of the service cable.

By the proposal in accordance with the invention, it is possible to minimize the unusable length of the connecting cable to the approximately S-shaped piece of connecting cable between the equalization drum and the service drum which is held fixed in space with respect to the double cable drum. Stretched out, this connecting piece corresponds to not more than approximately the diameter of the service drum.

One essential embodiment contemplates having the service cable and the equalization cable wound up spirally in the same direction on their corresponding drums.

By spiral winding in the same direction it is to be understood that, starting from the inner turn, the further turns are produced by wrapping the corresponding drum in the same direction of wrapping. Rotation of the couble cable drum in the direction of the unwinding of the service cable produces a radial widening of the spiral of the equalization cable. This widening, however, is used for the translation of the double cable drum in the direction of the lengthening of the connecting cable. Conversely, winding of the connecting cable on the double cable drum shortens the cable which corresponds to the sum of the wound lengths of service and equalization cables.

As an alternative to spiral winding, the service cable and the equalization cable can be wound on their associated drums in opposite directions, in each case with turns adjacent to each other on the same drum diameter. Here the corresponding sections of the connecting cable are in the shape of a helix on cylindrical drums whose axial length corresponds to the number of turns of cable multiplied by the cable diameter.

In one preferred embodiment, the double cable drum is received for translation by motor in a longitudinal guide which is fastened on the underside of the floor of the gate, the longitudinal movement of the double cable drum being synchronized with the rotation, i.e. the longitudinal translation corresponds to the wound and unwound cable lengths of the equalization cable. In order to reduce the structural expense, it may be advantageous to provide a common drive for the rotation and translation of the double cable drum.

In another advantageous solution, the longitudinal guide consists of travel rails and a trolley on the underside of which the double cable drum is attached. This applies of course also to the units connected to the double cable drum, such as motor, transmission and the like.

In a variant, the longitudinal guide consists of extendable rails on the travel sections of which the double cable drum is fastened. This embodiment makes it possible to shorten the cable length of the service cable, for instance by running the rails out beyond the head of the gate in the direction towards the aircraft socket.

Instead of a separate longitudinal guide for the double cable drum or in addition thereto, the wound or unwound length of cable of the equalization drum can also be taken up by any other type of lengthwise equalization, for instance by the shortening or lengthening of an extendable gate.

One embodiment of the invention will be described below with reference to the drawing, in which FIG. 1 shows the stowing device in side view in two positions of the double cable drum, and FIG. 2 is a top view of the stowing device (without gate floor), also in two positions.

FIG. 3 is a fragmentary side view of a variant of the stowing device.

FIG. 1 shows the stowing device fastened on the underside of a gate floor 1. This device is received for translation on travel rails 2 on a trolley 3 having wheels 4. The shaft 5 of a double cable drum 6 is driven via a step-down transmission 7 from a geared motor 8. For the translation of the trolley, a separate travel motor 9 is provided. The double cable drum 6 consists of two coaxial drums, namely an equalization drum 10 and a service drum 11. The equalization drum 10 has a smaller diameter d (FIG. 2) than the service drum 11 which has the diameter D (Figure 2). The cable section referred to as equalization cable 12 of a connecting cable 13 is wound on the equalization drum 12. The section of the connecting cable 13 adjoining the equalization cable 12, referred to as the service cable 14, is wound on the service drum 11. In the embodiment shown in the drawing, the number of turns n on both drums 10, 11 is n=3 each.

In FIG. 1, left-hand showing in solid lines, the double cable drum 6 is shown in the wound position; to the right thereof, the double cable drum 6 is shown in dot dash lines in the unwound position.

During the unwinding of the service cable 14, the double cable drum 6 moves increasingly towards the right corresponding to the length of cable of the equalization cable 12 which is thereby freed. Upon the winding up of the service cable 14, the trolley 3 together with the double cable drum 6 moves in the opposite direction, namely from right to left. The connecting cable 13 which is connected to a central transformer station is secured in position before its entrance into the equalization drum 10 by means of a cable clamp 15. The adjoining section thereof is formed by the equalization cable 12 which is wound several times around the equalization drum 10. Between the equalization drum 10 and the service drum 11 there extends a length of connecting cable 16 which is fastened at at least one point and is laid in S shape. The radii of the arcuate sections are so large that damage to the cable as a result of its deformation is excluded. The same is true, of course, of the diameter of the equalization drum, which is determined by a plurality of bolts 17 arranged on a circle. The diameter of the service drum 12 is in corresponding manner also defined by bolts 18 arranged on a circle (Figure 2).

The drum diameter of the equalization drum and the service drum may vary depending on the existing conditions of installation. The diameter of the equalization drum may even be equal to or greater than that of the service drum. The travel path can be increased or reduced as a function of the number of turns.

The view of FIG. 2 is an accurate top view of the arrangement of FIG. 1. To this extent, the parts can be designated by the same reference numbers. It can be seen that the travel rails 2 are connected to each other at their facing ends by transverse rails 19. At the end of the service cable 14 an aircraft plug 20 is provided which serves to connect the connecting cable 13 to a socket on the aircraft.

Upon the unwinding of the service cable 14, the double cable drum turns several times, namely as a function of the number of turns n of cable around its axis, in which connection we have approximately Travel path $W = d \cdot \pi \cdot n$, as indicated in FIG. 2;
Service cable $l = D \cdot \pi n$.
Total service length $L = (D + d)\pi \cdot n$.

The view of FIG. 3 is only a fragmentary view from the direction of FIG. 2, showing a frame comprised of longitudinal rails 2' which are connected at both ends by transverse rails 19. The frame includes a schematically illustrated moveable section. The moveable section is shown in both a non-extended position (solid lines) and in an extended position (dashed lines). In the extended position, the moveable section extends beyond a head (illustrated schematically at A) of the gate 1.

I claim:

1. A stowing device for a cable feed, particularly for a connecting cable, comprising:
   a double cable drum for receiving, without twisting, corresponding cable lengths for serving as service cable and equalization cable, the cable drum comprising a service drum for the service cable and an equalization drum coaxial with the service drum for the equalization cable, the equalization drum having a smaller diameter than the service drum; the service cable and the equalization cable are wound spirally in the same direction on their respective drums; a drive for rotating the double cable drum in both directions;
   a longitudinal guide for guiding longitudinal translation of the cable drum; means for translating the rotatable cable drum for displacing the double cable drum along the longitudinal guide over a distance which is equal to the length of the equalization cable which is freed or wound up, while the service cable is being unwound or wound, respectively.

2. A stowing device for a cable feed, particularly for a connecting cable, comprising
   a double cable drum for receiving, without twisting, corresponding cable lengths for serving as service cable and equalization cable, the cable drum comprising a service drum for the service cable and an equalization cable, the equalization drum having a smaller diameter than the service drum; the service cable and the equalization cable are wound spirally in the same direction on their respective drums; a first drive for selectively rotating the double cable drum in either of both directions;
   a longitudinal guide for guiding longitudinal translation of the cable drum; a second drive for translating the rotatable cable drum for displacing the double cable drum along the longitudinal guide; the second drive being synchronized with the first drive for displacing the double cable drum over a the longitudinal guide; the second drive being synchronized with the first drive for displacing the double cable drum over a distance which is equal to the length of the equalization cable which is freed or wound up, while the service cable is being unwound or wound, respectively.

3. A device according to claim 2, further comprising a gate having a floor, the double cable drum is supported to move along the longitudinal guide, and the guide is fastened to the bottom of the gate floor.

4. A device according to claim 2, wherein the longitudinal guide comprises travel rails, and a trolley having an underside on which the double cable drum is arranged and the trolley being movable along the rails.

5. A device according to claim 2, said longitudinal guide comprising a rail and said rail having a moveable section which is extendable beyond the head of a gate to make it possible to shorten the length of the service cable.

* * * * *